(12) United States Patent
Lee et al.

(10) Patent No.: US 11,609,651 B2
(45) Date of Patent: Mar. 21, 2023

(54) ELECTRONIC DEVICE AND DEVICE WITH TOUCH SENSING

(71) Applicant: SAMSUNG ELECTRO-MECHANICS CO., LTD., Suwon-si (KR)

(72) Inventors: Gye Won Lee, Suwon-si (KR); Jong Yun Kim, Suwon-si (KR); Mun Sun Jung, Suwon-si (KR); Hong Seok Lee, Suwon-si (KR); Chang Ju Lee, Suwon-si (KR); Hee Sun Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/502,494

(22) Filed: Oct. 15, 2021

(65) Prior Publication Data
US 2022/0382404 A1    Dec. 1, 2022

(30) Foreign Application Priority Data

May 25, 2021   (KR) .................... 10-2021-0066800
Aug. 2, 2021   (KR) .................... 10-2021-0101424

(51) Int. Cl.
*G06F 3/041* (2006.01)

(52) U.S. Cl.
CPC ........ *G06F 3/0414* (2013.01); *G06F 3/04186* (2019.05)

(58) Field of Classification Search
CPC ............................ G06F 3/0414; G06F 3/04186
See application file for complete search history.

(56) References Cited

U.S. PATENT DOCUMENTS

| | | | |
|---|---|---|---|
| 2011/0084936 A1* | 4/2011 | Chang | G06F 3/0446 |
| | | | 345/174 |
| 2015/0130649 A1 | 5/2015 | Itakura et al. | |
| 2016/0179241 A1* | 6/2016 | Vandermeijden | G06F 3/044 |
| | | | 345/174 |

FOREIGN PATENT DOCUMENTS

| | | |
|---|---|---|
| JP | 2009-141819 A | 6/2009 |
| JP | 2015-95865 A | 5/2015 |
| KR | 10-0880522 B1 | 1/2009 |

* cited by examiner

*Primary Examiner* — Afroza Chowdhury
(74) *Attorney, Agent, or Firm* — NSIP Law

(57) ABSTRACT

A device with touch sensing. The device includes a first sensor configured to detect a touch and to provide a first sensing signal, a second sensor configured to detect another touch and to provide a second sensing signal, a threshold generator configured to set a first threshold by a reflecting of an amount of change of the second sensing signal to an initial threshold, and a sensor circuit configured to generate a first differential signal based on the first sensing signal, and to determine a first touch based on a consideration of the first threshold with respect to a first signal generated based on the first differential signal and the first sensing signal.

20 Claims, 11 Drawing Sheets

ELECTRONIC DEVICE AND DEVICE WITH TOUCH SENSING

CROSS-REFERENCE TO RELATED APPLICATION(S)

This application claims benefit under 35 USC 119(a) of Korean Patent Application No. 10-2021-0066800 filed on May 25, 2021 in the Korean Intellectual Property Office, and Korean Patent Application No. 10-2021-0101424 filed on Aug. 2, 2021 in the Korean Intellectual Property Office, the entire disclosures of which are incorporated herein by reference for all purposes.

BACKGROUND

1. Field

The present disclosure relates to devices with touch sensing.

2. Description of Related Art

In the case of a typical mechanical switch, a large size and amount of space are required internally to implement the switch function, and a typical mechanical switch may have a structure that is not integral, as a non-limiting example, with an external case or may have a shape protruding outwardly.

In addition, with a typical mechanical switch, there is a risk of electric shocks due to direct contact with a mechanical switch that is electrically connected, and as a non-limiting example it may be difficult to implement dustproofing and waterproofing due to the structure of the mechanical switch.

A typical non-mechanical switch may include a force sensor sensing a pressing force by using a change in resonance frequency when force is applied to surface.

For example, when a user applies pressure to the example surface, a sensor (e.g., a coil) and a case (e.g., a conductor) of may become closer, which may result in an eddy current being induced in the sensor, changing, e.g., reducing, an inductance of the sensor. For example, a resonance frequency may increase due to a decrease in inductance, so that a touch can be sensed.

Thus, in the typical non-mechanical switch, for example, a touch may be detected according to, or dependent on, a change in physical distance between the sensor and a case by the touch. When separate non-mechanical switches are used, the separate switches may operate independently. However, when a distance between respective buttons or touch members of the separate non-mechanical switches are close, when a first change in physical distance between one touch member and a sensor occurs, the first change in physical distance may also result in a change in physical distance between the other physically close touch member and a sensor.

SUMMARY

In one general aspect, a device with touch sensing includes a first sensor configured to detect a touch and to provide a first sensing signal, a second sensor configured to detect another touch and to provide a second sensing signal, a threshold generator configured to set a first threshold by a reflecting of an amount of change of the second sensing signal to an initial threshold, and a sensor circuit configured to generate a first differential signal based on the first sensing signal, and to determine a first touch based on a consideration of the first threshold with respect to a first signal generated based on the first differential signal and the first sensing signal.

The threshold generator may be configured to set a second threshold by a reflecting of an amount of change of the first sensing signal to the initial threshold.

The threshold generator may be connected to the first sensor and the second sensor, and the sensor circuit may be configured to generate a second differential signal by differentiating the second sensing signal, and to determine a second touch based on a consideration of the second threshold with respect to a second signal generated based on the second differential signal and the first sensing signal.

The threshold generator may be configured to set the first threshold based on a difference value between the initial threshold and the second sensing signal, and to set the second threshold based on a difference value between the initial threshold and the first sensing signal.

The threshold generator may include a first threshold generator configured to set the first threshold based on the amount of change of the second sensing signal being with respect to the initial threshold, and a second threshold generator configured to set the second threshold based on the amount of change of the first sensing signal being with respect to the initial threshold.

The threshold generator may include a first threshold generator configured to set a first detection threshold based on a difference value between the initial threshold and the second sensing signal, and configured to set a first release threshold, different from the first detection threshold, based on the initial threshold, and a second threshold generator configured to set a second detection threshold based on a difference value between the initial threshold and the first sensing signal, and configured to set a second release threshold, different from the second detection threshold, based on the initial threshold.

The first threshold generator may be configured to set the first detection threshold by adding the amount of change, based on the initial threshold, of the second sensing signal to the initial threshold, and may be configured to set the first release threshold to be the initial threshold.

The second threshold generator may be configured to set the second detection threshold by adding the amount of change, based on the initial threshold, of the first sensing signal to the initial threshold, and may be configured to set the second release threshold to be the initial threshold.

The sensor circuit may be configured to generate the first differential signal of the first sensing signal, generate the first signal, as a first detection signal, based on the first sensing signal, determine the first touch to a first touch member by comparing the first detection signal with the first threshold, generate the second differential signal of the second sensing signal, generate the second signal, as a second detection signal, based on the second sensing signal, and determine the second touch to a second touch member by comparing the second detection signal with the second threshold.

The sensor circuit may include a first sensor circuit configured to generate the first differential signal by differentiating the first sensing signal, generate the first signal, as a first detection signal, by adding the first differential signal and the first sensing signal, and determine the first touch to a first touch member, for a case of an electronic device, by comparing the first detection signal with the first threshold, and a second sensor circuit configured to generate the second signal, as a second detection signal, by adding the second differential signal and the first sensing signal, and determine the second touch to a second touch member, for the case of the electronic device, by comparing the second detection signal with the second threshold.

In one general aspect, a device with touch sensing includes a case having a first touch member and a second touch member disposed at different positions of the case, and a touch sensing device configured to respectively sense first and second touches to the first and second touch members, where the touch sensing device includes a first sensor configured to detect a touch and to provide a first sensing signal, a second sensor configured to detect another touch and to provide a second sensing signal, a threshold generator configured to set a first threshold by a reflecting of an amount of change of the second sensing signal to an initial threshold, and a sensor circuit configured to generate a first differential signal based on the first sensing signal, and to determine the first touch based on a consideration of the first threshold with respect to a first signal generated based on the first differential signal and the first sensing signal.

The threshold generator may be configured to set a second threshold by a reflecting of an amount of change of the first sensing signal to the initial threshold.

The threshold generator may be connected to the first sensor and the second sensor, and the sensor circuit may be configured to generate a second differential signal by differentiating the second sensing signal, and determine the second touch based on a consideration of the second threshold with respect to a second signal generated based on the second differential signal and the first sensing signal.

The threshold generator may be configured to set the first threshold based on a difference value between the initial threshold and the second sensing signal, and to set the second threshold based on a difference value between the initial threshold and the first sensing signal.

The threshold generator may include a first threshold generator configured to set the first threshold based on the amount of change of the second sensing signal being with respect to the initial threshold, and a second threshold generator configured to set the second threshold based on the amount of change of the first sensing signal being with respect to the initial threshold.

The threshold generator may include a first threshold generator configured to set a first detection threshold based on a difference value between the initial threshold and the second sensing signal, and configured to set a first release threshold, different from the first detection threshold, based on the initial threshold, and a second threshold generator configured to set a second detection threshold based on a difference value between the initial threshold and the first sensing signal, and configured to set a second release threshold, different from the second detection threshold, based on the initial threshold.

The first threshold generator may be configured to set the first detection threshold by adding the amount of change, based on the initial threshold, of the second sensing signal to the initial threshold, and may be configured to set the first release threshold to be the initial threshold.

The second threshold generator may be configured to set the second detection threshold by adding the amount of change, based on the initial threshold, of the first sensing signal to the initial threshold, and may be configured to set the second release threshold to be the initial threshold.

The sensor circuit may be configured to generate the first differential signal of the first sensing signal, generate the first signal, as a first detection signal, based on the first sensing signal, determine the first touch to the first touch member by comparing the first detection signal with the first threshold, generate the second differential signal of the second sensing signal, generate the second signal, as a second detection signal, based on the second sensing signal, and determine the second touch to the second touch member by comparing the second detection signal with the second threshold.

The sensor circuit may include a first sensor circuit configured to generate the first differential signal by differentiating the first sensing signal, generate the first signal, as a first detection signal, by adding the first differential signal and the first sensing signal, and determine the first touch to the first touch member by comparing the first detection signal with the first threshold, and a second sensor circuit configured to generate the second signal, as a second detection signal, by adding the second differential signal and the first sensing signal, and determine the second touch to the second touch member by comparing the second detection signal with the second threshold.

BRIEF DESCRIPTION OF THE DRAWINGS

Throughout the drawings and the detailed description, the same reference numerals refer to the same or like elements. The drawings may not be to scale, and the relative sizes, proportions, and depictions of elements in the drawings may be exaggerated for clarity, illustration, and convenience.

DETAILED DESCRIPTION

Figure 1:
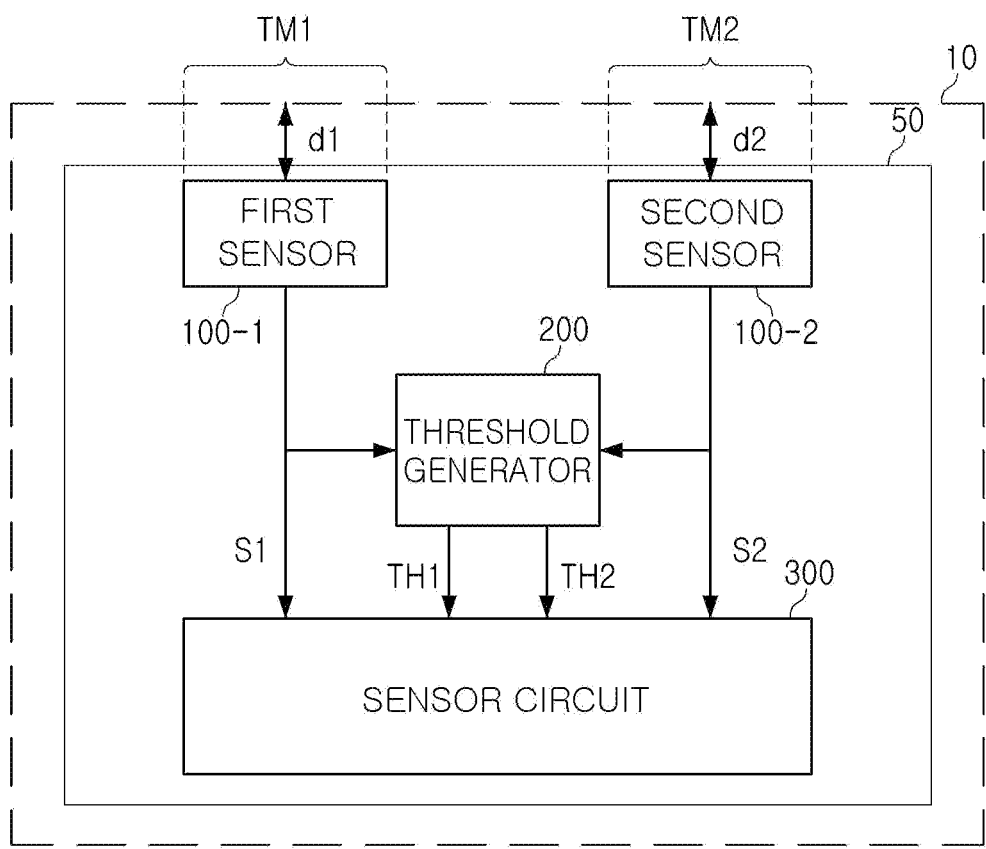
FIG. 1 is a diagram of an example touch sensing device according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of features that are known or understood after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while various embodiments of the disclosure of this application will be described in detail with reference to the accompanying drawings, it is noted that examples are not limited to the same.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing. Further, the drawings may not be to scale, and the relative size, proportions, and depiction of elements in the drawings may be exaggerated for clarity, illustration, and convenience. Still further, the structures, shapes, and numerical values described as one example of one or more embodiments may be non-limiting examples to help the reader understand example technical matters of the disclosure of this application, and such examples are not limited thereto, and the spirit and scope of the present disclosure are also not limited thereto. Examples herein may include various components, features, and embodiments of the disclosure of this application being variously combined as one or more example components, features, or embodiments, as non-limiting examples.

In one or more embodiments, an example electronic device (e.g., a wearable device, as a non-limiting example) with a touch sensing device may have a thinner, simpler and neater design than a typical electronic device that uses a mechanical switch. In addition, in one or more embodiments, the example electronic device may be further configured to provide dustproofing and waterproofing, and may as well provide a smooth design and unity compared to typical electronic devices with typical mechanical switches.

One or more embodiments may provide the example electronic device with touch sensing devices configured to implement force touch detection using plural touch sensors, and may be further configured to implement one or more of a touch-on-metal (ToM) technology, a capacitor sensing technology using a touch panel, a micro-electro-mechanical-system (MEMS), a micro strain gauge technology, and the like.

Figure 2:
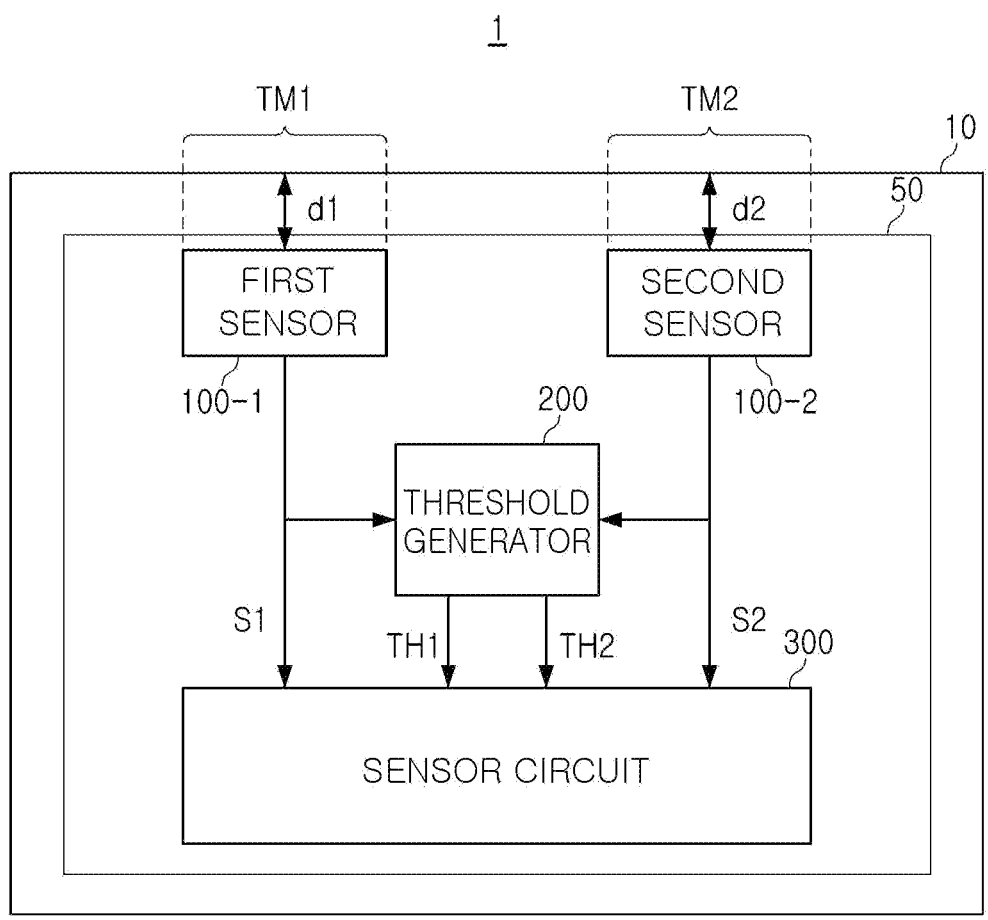
FIG. 2 is a diagram of an example electronic device according to one or more embodiments.

As non-limiting examples of devices with touch sensing, FIG. 1 is a diagram of an example touch sensing device according to one or more embodiments, and FIG. 2 is a diagram of an example electronic device according to one or more embodiments. Herein, devices with touch sensing may include the touch sensing device, multiple touch sensing devices, and the electronic device with one or more touch sensing devices, and thus, references to a touch sensing device should also be understood to refer to an electronic device with one or more of the touch sensing devices.

As non-limiting examples, referring to FIG. 2, an electronic device 1 may include a case 10 disposed outside of the touch sensing device 50, and a touch sensing device 50 disposed inside the case 10.

The case 10 may include a first touch member TM1 and a second touch member TM2 disposed in different positions. For example, each of the first touch member TM1 and the second touch member TM2 may be positioned to face each sensor included in the touch sensing device 50.

The touch sensing device 50 may independently sense a touch of each of the first touch member TM1 and the second touch member TM2.

Referring to FIGS. 1 and 2, the touch sensing device 50 may include a first sensor 100-1, a second sensor 100-2, a threshold generator 200, and a sensor circuit 300.

The first sensor 100-1 may be electrically connected to the threshold generator 200 and the sensor circuit 300, and detect a touch applied to the first touch member TM1 to provide a first sensing signal S1.

The second sensor 100-2 may be electrically connected to the threshold generator 200 and the sensor circuit 300, and detect a touch applied to the second touch member TM2 to provide a second sensing signal S2.

The threshold generator 200 may be connected to the first sensor 100-1 and the second sensor 100-2, and may be configured to receive or consider the first sensing signal S1 and the second sensing signal, and set a first threshold TH1 by reflecting an amount of change of the second sensing signal S2 to an initial threshold value TH. The initial threshold TH may be set in advance of the sensing operations of the first sensor 100-1 or the second sensor 100-2, i.e., the initial threshold TH may be predetermined.

In addition, the threshold generator 200 may set a second threshold value TH2 by reflecting an amount of change of the first sensing signal S1 to the initial threshold value TH.

As described above, in one or more embodiments, by reflecting the amount of change of each of the first and second sensing signals to the initial threshold, as described above, such an example technique for setting the first and second thresholds for determining the first and second sensing signals may be performed. Such examples of reflecting the amount of change of each of the first and second sensing signals to the initial threshold is referred to herein as an adaptive threshold setting technology.

The sensor circuit 300 may generate a first differential signal SD1 by differentiating the first sensing signal S1 received from the first sensor 100-1 to generate a first differential signal SD1, and determine a first touch based on a first threshold TH1 with respect to a signal generated using the first differential signal SD1 and the first sensing signal S1.

In addition, the sensor circuit 300 may generate a second differential signal SD2 by differentiating the second sensing signal S2 received from the second sensor 100-2, and determine a second touch based on a second threshold TH2 with respect to a signal generated using the second differential signal SD2 and the second sensing signal S2.

As a non-limiting example, in one or more embodiments the electronic device may be a mobile device such as a smart phone or a wearable device such as a smart watch, noting that alternate examples are also available.

Figure 3:
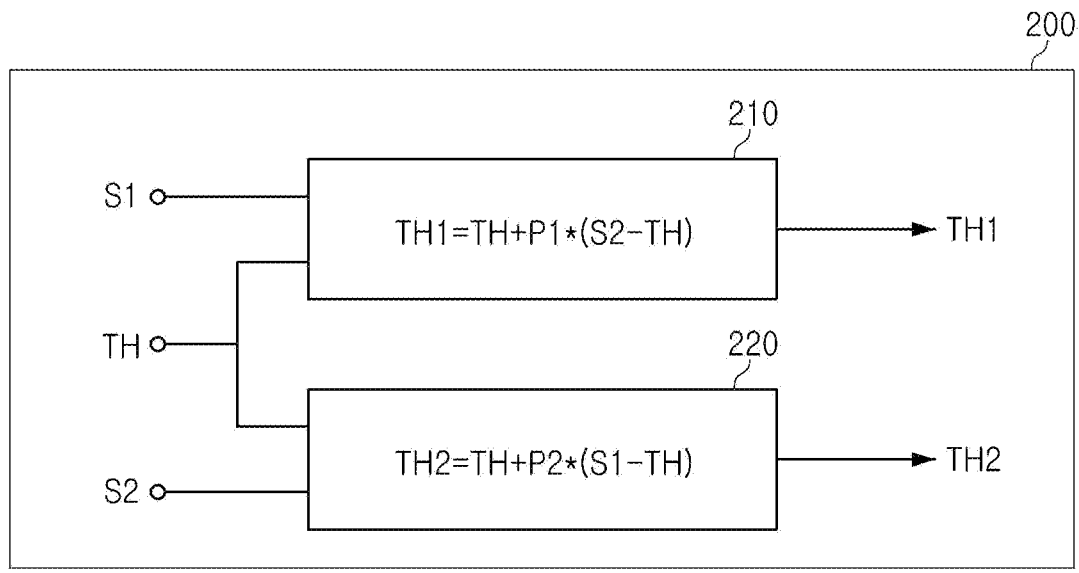
FIG. 3 is a diagram of an example threshold generator according to one or more embodiments.

FIG. 3 is a diagram of an example threshold generator according to one or more embodiments.

Referring to FIG. 3, the threshold generator 200 may set a first threshold TH1 using a difference value between an initial threshold TH and the second sensing signal S2, and set a second threshold TH2 using a difference value between the initial threshold TH and the first sensing signal S1.

For example, the threshold generator 200 may include a first threshold generator 210 and a second threshold generator 220.

The first threshold generator 210 may set a first threshold TH1 as shown in an example Equation 1 below by using an amount of change of the second sensing signal S2 based on the initial threshold TH.

$$TH1=TH+P1*(S2-TH) \qquad \text{Equation 1:}$$

The second threshold generator 220 may set a second threshold TH2 as shown in an example Equation 2 below by using an amount of change of the first sensing signal S1 based on the initial threshold TH.

$$TH2=TH+P2*(S1-TH) \qquad \text{Equation 2:}$$

In Equations 1 and 2, P1 and P2 may be first proportionality constants, for example, may be set to a predetermined error based on 1, and may be real numbers within a range of "1±0.5". Here, this range is merely an example and embodiments are not limited thereto.

For example, when P1=P2=1, the first threshold TH1 may be a value obtained by adding an initial threshold TH to a difference value S2−TH between the initial threshold TH and the second sensing signal S2, and the second threshold TH2 may be a value obtained by adding an initial threshold TH to a difference value S1−TH between the initial threshold value TH and the first sensing signal S1.

Figure 4:
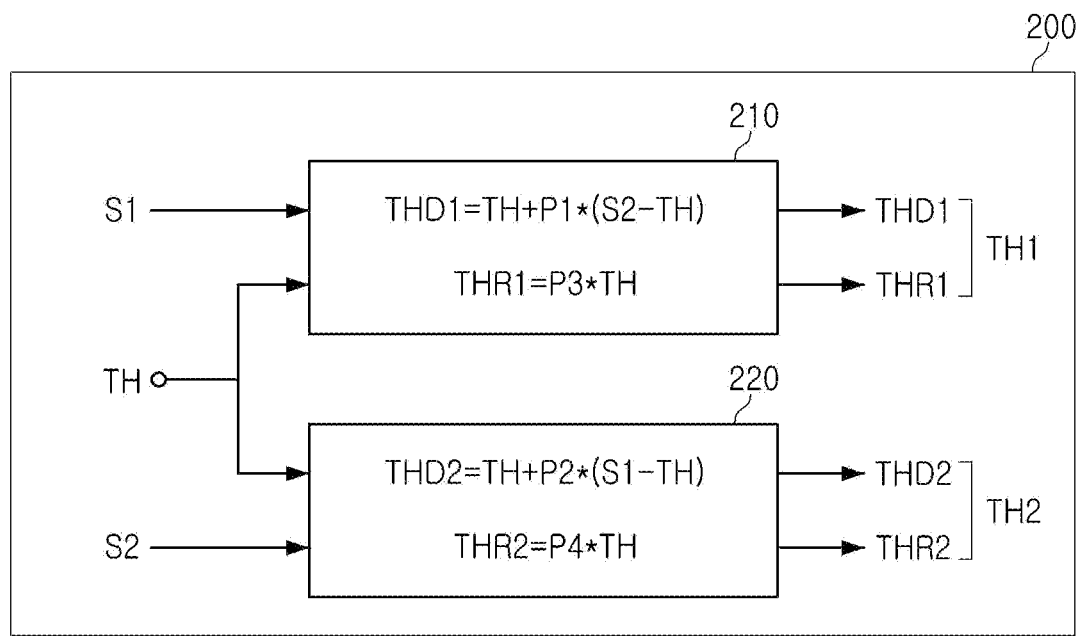
FIG. 4 is a diagram of an example threshold generator according to one or more embodiments.

FIG. 4 is a diagram of an example threshold generator according to one or more embodiments.

Referring to FIG. 4, the threshold generator 200 may include a first threshold generator 210 and a second threshold generator 220.

The first threshold generator 210 may set the first detection threshold THD1 by adding an amount of change of the second sensing signal S2 to the initial threshold TH, and set the initial threshold TH as the first release threshold THR1.

For example, the first threshold generator 210 may set a first detection threshold THD1 as shown in an example Equation 3 below using a difference value between the initial threshold TH and the second sensing signal S2, and set a first release threshold THR1, different from the first detection threshold THD1 as shown in an example Equation 4 below using the initial threshold TH.

$$THD1=TH+P1*(S2-TH) \qquad \text{Equation 3:}$$

$$THR1=P3*TH \qquad \text{Equation 4:}$$

The second threshold generator 220 may set the second detection threshold THD2 by adding an amount of change of the first sensing signal S1 to the initial threshold TH, and set the initial threshold TH as the second release threshold THR2.

For example, the second threshold generator 220 may set a second detection threshold THD2 as shown in an example Equation 5 below using a difference value between the initial threshold TH and the first sensing signal S1, and set a second release threshold THR2, different from the second detection threshold THD2 as shown in an example Equation 6 below using the initial threshold TH.

$$THD2=TH+P2*(S1-TH) \qquad \text{Equation 5:}$$

$$THR2=TH+P4*(S2-TH) \qquad \text{Equation 6:}$$

In Equations 1-6, P1, P2, P3, and P4 may be first proportionality constants, for example, may be set to a predetermined error based on 1, and may be a real number within the non-limiting range of "1±0.5", again noting that such a range is merely an example and examples herein include alternate range embodiments for one or more or all of P1, P2, P3, and P4, while embodiments are not limited thereto.

As a non-limiting example, when P1=P2=P3=P4=1, the first detection threshold THD1 may be a difference value S2-TH between the initial threshold TH and the second sensing signal S2, and the second detection threshold THD2 may be a difference value S1-TH between the initial threshold TH and the first sensing signal S1. In addition, the first release threshold THR1 and the second release threshold THR1 may be the initial threshold value TH.

Figure 5:
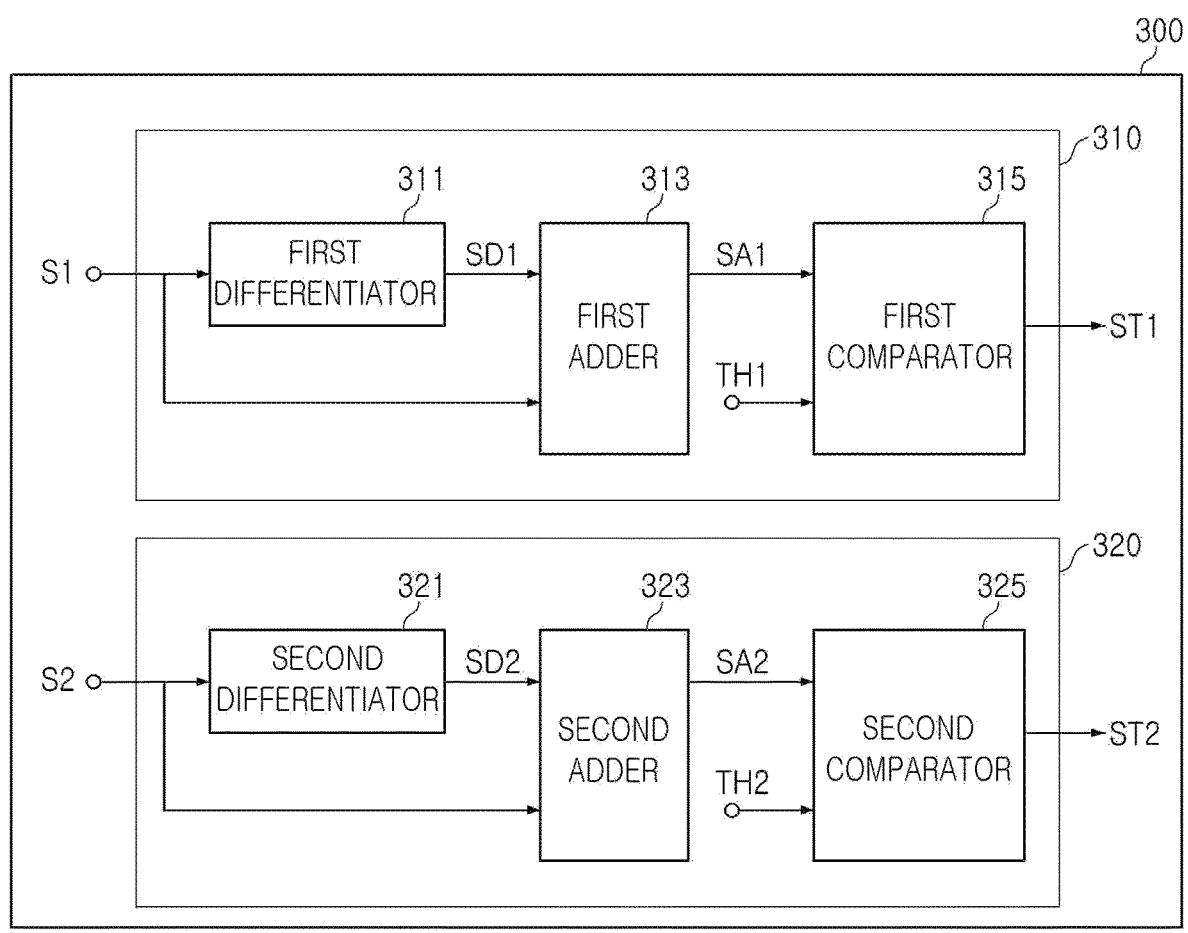
FIG. 5 is a diagram of an example sensor circuit according to one or more embodiments.

FIG. 5 is a diagram of an example sensor circuit according to one or more embodiments.

Referring to FIG. 5, the sensor circuit 300 may generate a first differential signal SD1 of the first sensing signal S1 and a first detection signal SA1 using the first sensing signal S1, and compare the first detection signal SA1 with the first threshold TH1 to determine a first touch to a first touch member TM1, and may generate a second differential signal SD2 of the second sensing signal S2 and a second detection signal SA2 using the second sensing signal S2, and compare the second detection signal SA2 with the second threshold TH2 to determine a second touch to a second touch member TM2.

For example, the sensor circuit 300 may include a first sensor circuit 310 and a second sensor circuit 320.

The first sensor circuit 310 may differentiate the first sensing signal S1 received from the first sensor 100-1 to generate a first differential signal SD1, add the first differential signal SD1 and the first sensing signal S1 to generate a first detection signal SA1, and compare the first detection signal SA1 with the first threshold TH1 to determine a first touch to the first touch member TM1.

For example, the first sensor circuit 310 may include a first differentiator 311, a first adder 313, and a first comparator 315.

The first differentiator 311 may generate a first differential signal SD1 by differentiating the first sensing signal S1 received from the first sensor 100-1.

The first adder 313 may add the first differential signal SD1 and the first sensing signal S1 to generate a first detection signal SA1.

The first comparator 315 may compare the first detection signal SA1 with the first threshold TH1 to output a first touch signal ST1 including information on whether a first touch has been made to the first touch member TM1.

The second sensor circuit 320 may differentiate the second sensing signal S2 received from the second sensor 100-2 to generate a second differential signal SD2, add the second differential signal SD2 and the second sensing signal S2 to generate a second detection signal SA2, and compare the second detection signal SA2 with the second threshold value TH2 to determine a second touch to the second touch member TM2.

For example, the second sensor circuit 320 may include a second differentiator 321, a second adder 323, and a second comparator 325.

The second differentiator 321 may generate a second differential signal SD2 by differentiating the second sensing signal S1 received from the second sensor 100-2.

The second adder 323 may add the second differential signal SD2 and the second sensing signal S2 to generate a second detection signal SA2.

The second comparator 325 may compare the second detection signal SA2 with the second threshold TH2 to output a second touch signal ST2 including information on whether a second touch has been made to the second touch member TM2.

Figure 6:
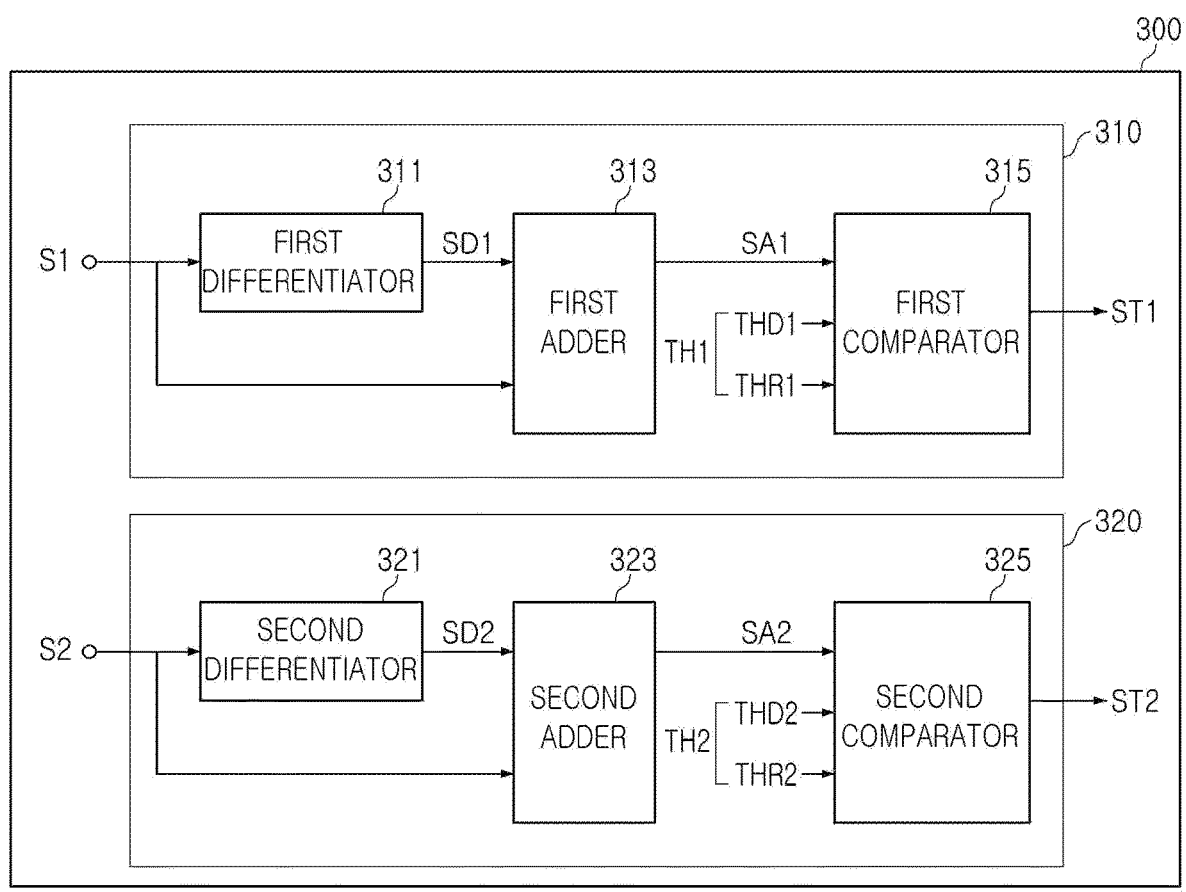
FIG. 6 is a diagram of an example sensor circuit according to one or more embodiments.

FIG. 6 is a diagram of an example sensor circuit according to one or more embodiments.

A sensor circuit 300 shown in FIG. 6 differs from the sensor circuit 300 shown in FIG. 5 in an example operation with respect to a first comparator 315 and a second comparator 325, for example, and thus, for brevity purposes the below discussion of FIG. 6 will explain example differences from the sensor circuit 300 of FIG. 5.

Here, with respect to the sensor circuit 300 of FIG. 6, the first comparator 315 may determine touch application and touch release to the first touch member TM1 using a first detection threshold THD1 and a first threshold TH1 including the first detection threshold THD1.

In addition, the second comparator 325 may determine touch application and touch release to the second touch member TM2 using a second detection threshold THD2 and a second threshold TH2 including the second detection threshold THD2. The first comparator 315 and the second comparator 325 will be described below.

For example, the first comparator 315 may compare the first detection signal SA1 with the first detection threshold THD1 to output a first touch signal ST1 including information on whether a first touch is applied to the first touch member TM1, and may compare the first detection signal SA1 with the first release threshold THR1 to output a first touch signal ST1 including information on whether a first touch is released to the first touch member TM1.

For example, the second comparator 325 may compare the second detection signal SA2 with the second detection threshold THD2 to output a second touch signal ST2 including information on whether a second touch is applied to the second touch member TM2, and may compare the second detection signal SA2 with the second release threshold THR2 to output a second touch signal ST2 including information on whether a second touch is released to the second touch member TM2.

Figure 7:
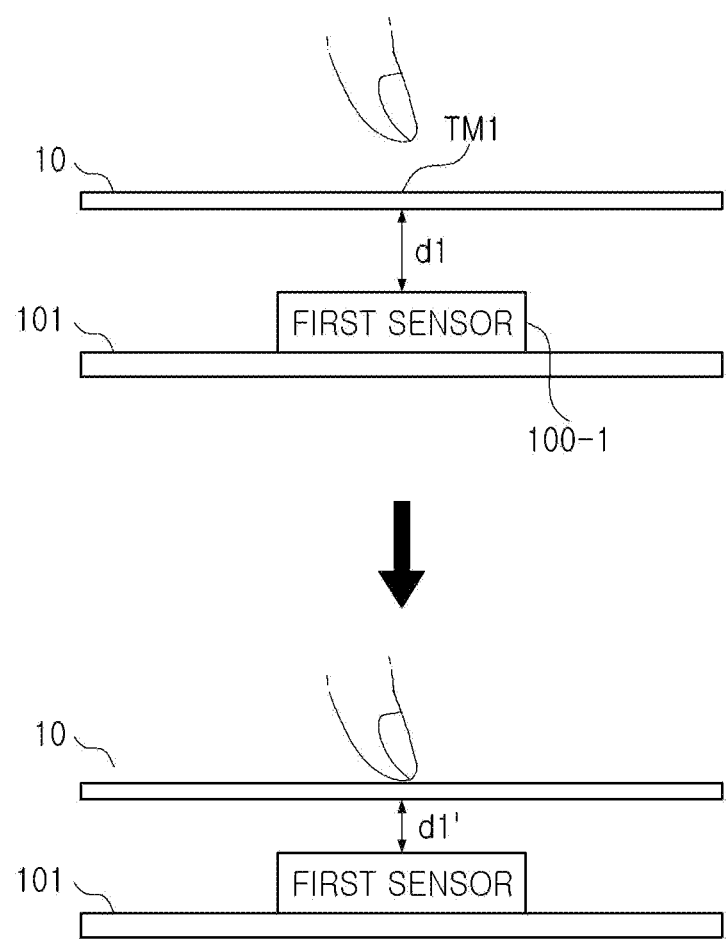
FIG. 7 is a diagram of an example operation of a first sensor (or a second sensor) according to one or more embodiments.

FIG. 7 is a diagram of an example operation of a first sensor (or a second sensor) according to one or more embodiments.

Referring to FIG. 7, when a user applies pressure to a first touch member TM1 disposed on a case 10 of an example electronic device 1, a distance between the first sensor 100-1 supported by a sensor support 101 and the first touch member TM1 may be narrowed from d1 to d1'. The first sensor 100-1 may be a sensor in a form of a coil, though embodiments are not limited thereto and alternate sensor structures are also available. The first touch member TM1 may be a conductive member such as a metal, for example.

For example, as the first sensor 100-1 and the first touch member TM1 come closer to each other, more eddy currents are induced, and an inductance of the first sensor 100-1 may be reduced by the eddy currents. Accordingly, as shown in an example Equation 7 below, a resonant frequency f1 increases, and according to this action, the electronic device can recognize a user's touch.

$$F1 = 1/\{2\pi * SQRT(L*C)\} \quad \text{Equation 7:}$$

Figure 8:
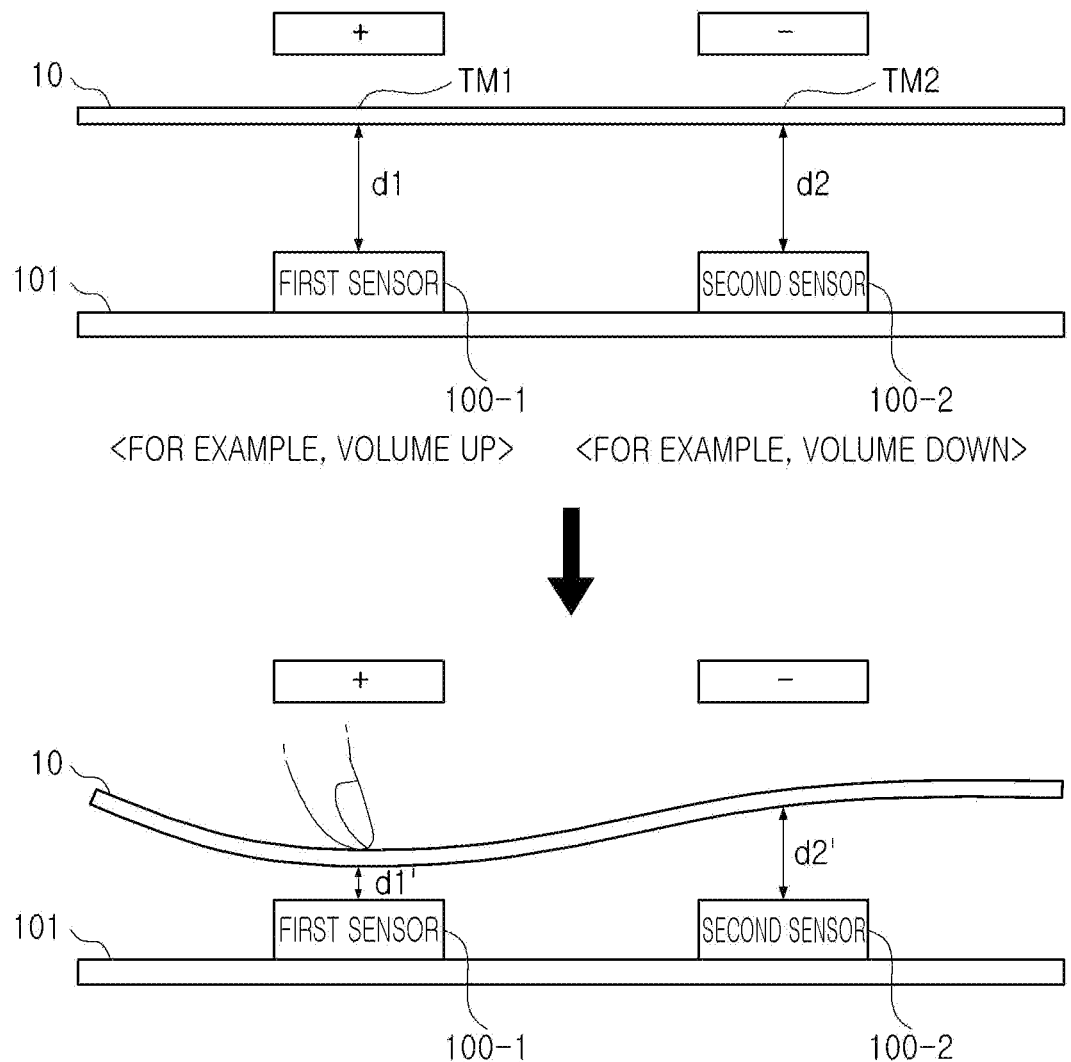
FIG. 8 is a diagram illustrating a potential generating of an unintended sensing signal according to one or more embodiments.

FIG. 8 is a diagram of a potential malfunction of a first sensor and a second sensor.

Referring to FIG. 8, a case in which a first sensor 100-1 and a second sensor 100-2, e.g., the first sensor 100-1 and the second sensor 100-2 of an example electronic device 1, correspond to a volume up button and a volume down button will be described.

For example, a physical distance between the first sensor 100-1 and the second sensor 100-2 of the electronic device 1 may be a close distance, e.g., approximately 10 mm as a non-limiting example, and the first sensor 100-1 and the second sensor 100-2 may respectively operate independently in the example electronic device 1. However, even when force is only applied to the first touch member TM1 facing the first sensor, a distance d1 between the first touch member TM1 and the first touch member TM1 may become narrow, and a distance d2 between the second sensor 100-2 and the first touch member TM2 may also become narrow, resulting in a touch detection malfunction with respect to the second sensor 100-2.

Such a potential malfunction may be described in more detail below with reference to FIGS. 9 and 10.

Figure 9:
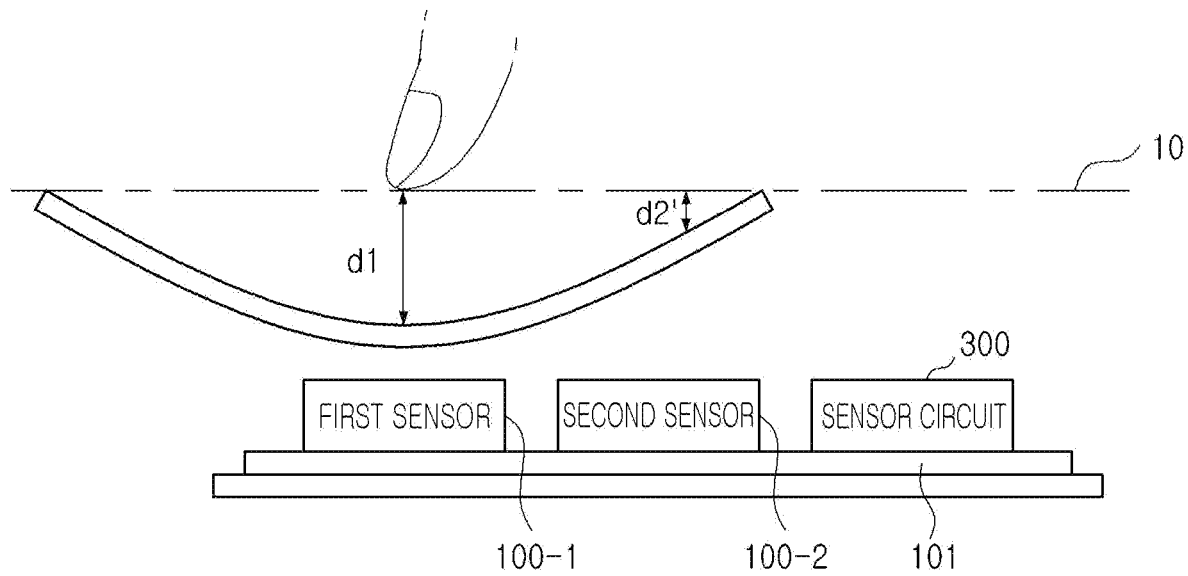
FIG. 9 is a diagram of a potential malfunctioning of a first sensor and a second sensor according to one or more embodiments.

FIG. 9 is a diagram illustrating a potential generating of an unintended sensing signal. FIG. 10 is a diagram illustrating example sensing signals of a first sensor and a second sensor.

Figure 10:
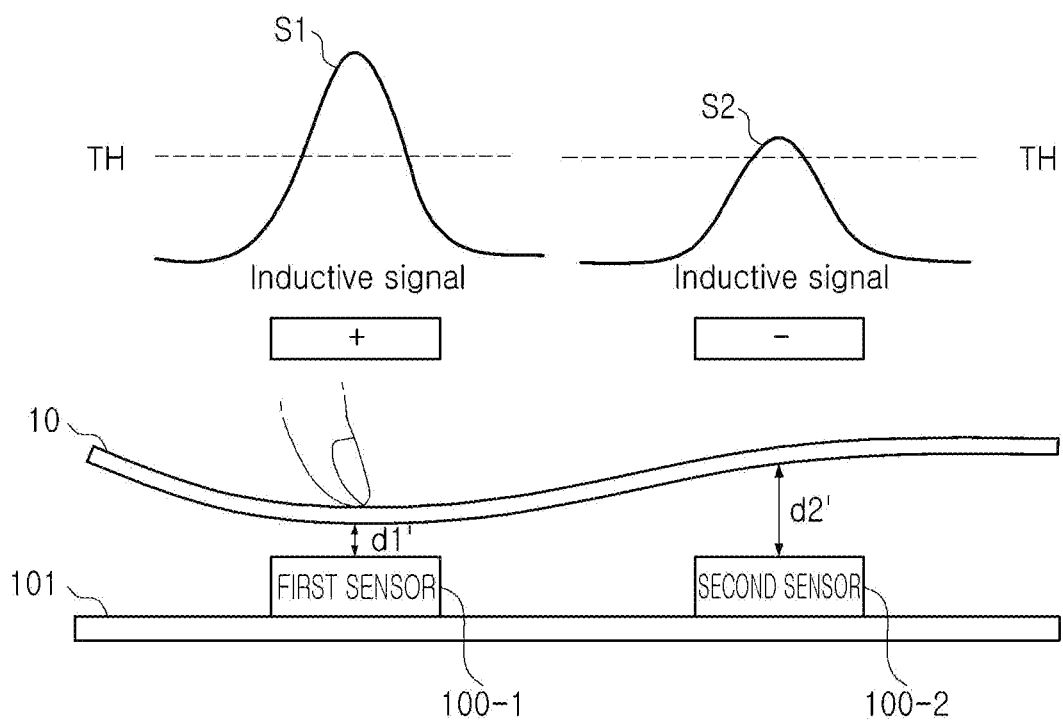
FIG. 10 is a diagram illustrating an example sensing of signals of a first sensor and a second sensor according to one or more embodiments.

Referring to FIGS. 9 and 10, when a first sensor 100-1 is pressed, the first sensor 100-1 is relatively closer to a case 10 (e.g., metal), while the second sensor 100-2 disposed adjacent to the first sensor 100-1 is slightly less close to the case 10, that is, each of the first sensor 100-1 and the second sensor 100-2 may be closer to the case 10 (e.g., metal) compared to a state (e.g., a non-touch state) before pressing.

For example, a distance between the first sensor 100-1 (e.g., a volume up sensor) and a first touch member TM1 (e.g., a volume up switch) may be narrowed from d1 to d1', and a distance between the second sensor 100-2 (e.g., a volume down sensor) and a second touch member TM2 (e.g., a volume down switch) may be narrowed from d2 to d2'.

In this case, inductance of the first sensor 100-1 decreases, and inductance of the second sensor 100-2 also decreases at the same time, which cause an effect of an increasing of the resonant frequency of each of the first and second sensors 100-1 and 100-2. If an intensity of a sensing signal having a resonance frequency is equal to or greater than a certain threshold, since the corresponding touch can be determined to be a touch input to a corresponding touch member, such a touch may affect both the first touch member and the second touch member, which may cause a detection malfunction.

As described above, depending on how strongly a user presses the touch member of the case, an error could occur in that both touch sensors may be determined to represent respective touch pressings of both sensors when the user in actuality is only pressing one first sensor.

In order to compensate for such a potential error, in one or more embodiments an adaptive threshold setting technology may be adopted by setting each threshold value (T/H) for determining a touch input of two touch members to two adjacent two sensors to be active by reflecting an amount of change of the corresponding sensing signal. In an example, the threshold setting technology may be implemented as a logic circuit or by other computing hardware.

As another example, referring to FIG. 10, when the first touch member is pressed, a first sensing signal S1 (e.g., an inductive signal) generated by the first sensor 100-1 becomes greater than or equal to a threshold TH, so that a touch input is detected, although the second touch member is not pressed, a second sensing signal S2 (e.g., an inductive signal) generated by the second sensor 100-2 becomes greater than or equal to the illustrated example threshold TH, so that a touch input may be detected.

As can be seen with reference to FIG. 10, it may be physically difficult for two sensors that are close to each other to secure structurally perfect isolation, and thus an erroneous detecting of a touch may occur.

Rather, in one or more embodiments, an adaptive threshold setting technology may be implemented. For example, when force, physical force, is applied to one sensor, signal mixing and interference between the sensors adjacent to each other may be blocked, which will be further described below with reference to FIGS. 11 to 16.

Figure 11:
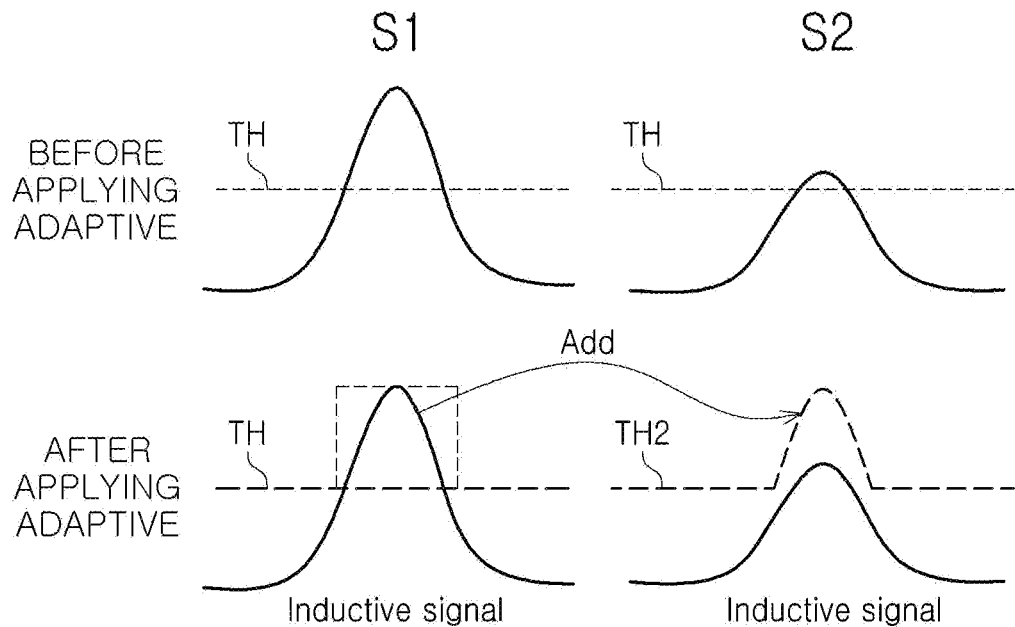
FIG. 11 is a diagram illustrating an example adaptive threshold value setting according to one or more embodiments.

FIG. 11 is a diagram illustrating an example adaptive threshold value setting according to one or more embodiments.

Referring to FIG. 11, by adopting a technology reflecting an amount of change of a first sensor 100-1 to a threshold of a second sensor 100-2, adjacent to the first sensor 100-1 to which force is input, such potential malfunctions or detection errors with typical threshold approaches may be lessened, reduced, or prevented.

As a non-limiting example, if the first sensor 100-1 is a volume down sensor of an electronic device, and the second sensor 100-2 is a power on/off sensor, in this case, if an operation of simultaneously applying a touch to the two sensors in the electronic device is to be implemented as an additional function of the electronic device, such as a screen capture function, when a touch is simultaneously applied to the two sensors, touch application may be detected while two sensing signals generated by the two sensors exceed a predetermined threshold.

When an example above-described adaptive threshold approach is used, e.g., by use of such an adaptive threshold logic circuit or other computing hardware, there may be a case in which an intentional simultaneous touch may not be detected.

Figure 12:
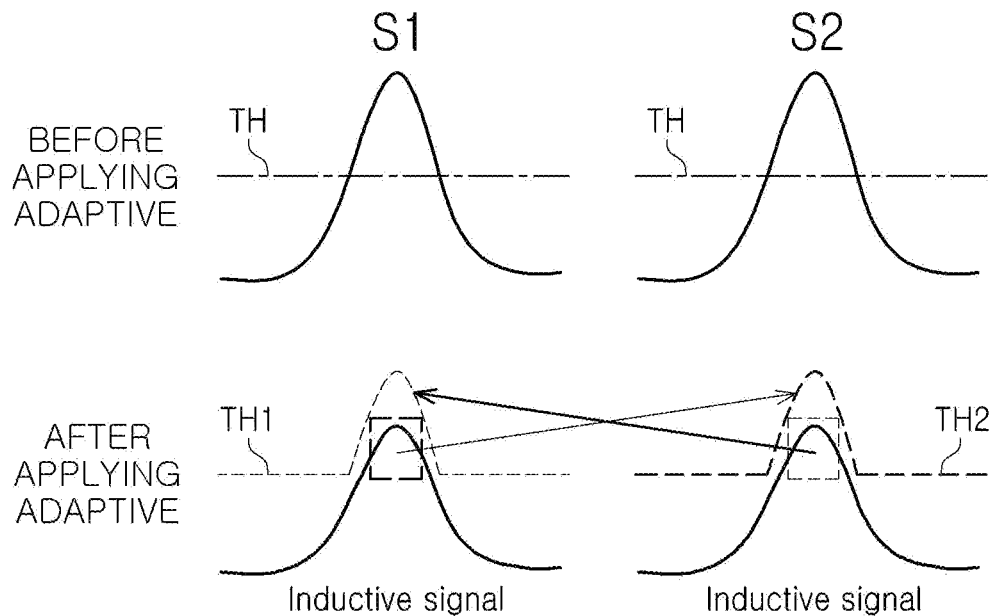
FIG. 12 is a diagram of an example threshold setting for an example ideal case.

FIG. 12 is a diagram of an example threshold setting for an example ideal case.

When an adaptive threshold setting technology is applied, threshold setting for an example ideal case will be described with reference to FIG. 12.

Assuming that both sensors are pressed simultaneously without delay at the same timing, as an amount of change of each sensing signal is reflected (e.g., added) to an initial threshold to adjacent sensing signals, and an adaptive threshold is applied, even though the two sensing signals by the simultaneous touch application exceed an initial threshold, an example adaptive threshold may not be exceeded, so a normal operation of detecting the simultaneous touching may not be achieved.

Figure 13:
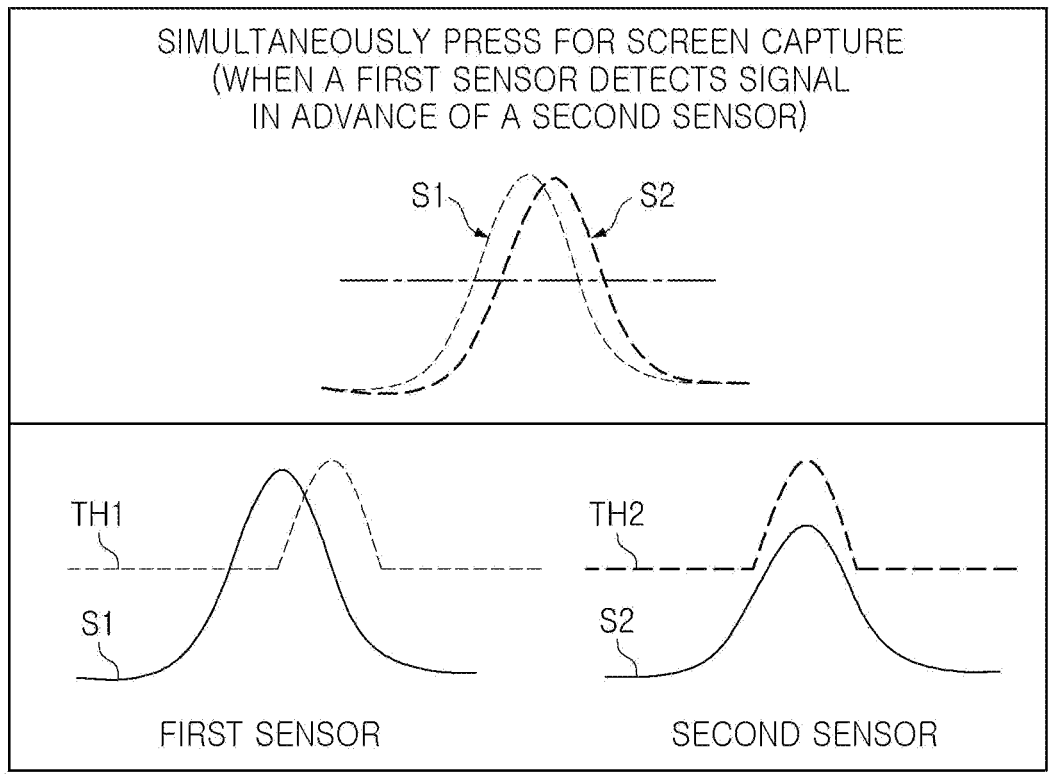
FIG. 13 is a diagram of a potential limitation of an example adaptive threshold setting according to one or more embodiments.

FIG. 13 is a diagram of a potential limitation in an example adaptive threshold setting according to one or more embodiments.

For example, for a screen capture and using FIG. 12 as an example, when the two sensors 100-1 and 100-2 are pressed simultaneously, a timing at which they are pressed may be different, so a case in which the first sensor detects a signal before the second sensor can be considered.

In this case, a first signal S1 by the first sensor 100-1 may be detected, but a second signal S2 by the second sensor 100-2 may not be detected, so the simultaneous touching may not be detected and the example screen capture function by the example electronic device may not be performed.

Figure 14:
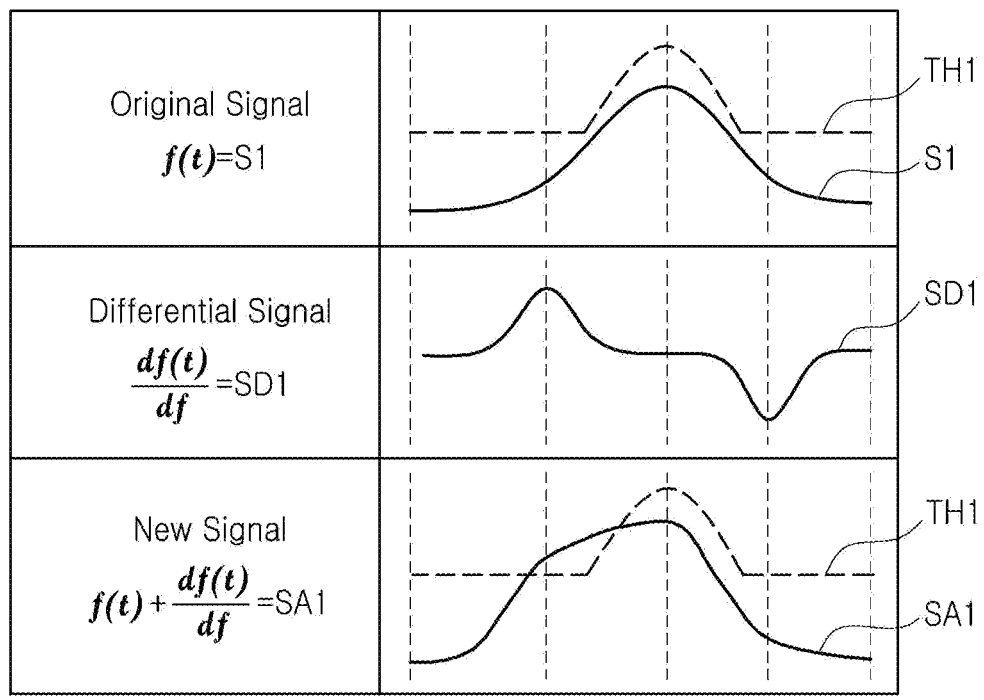
FIG. 14 is a diagram illustrating an example operation of an example sensor circuit according to one or more embodiments.

FIG. 14 is a diagram illustrating an example operation of a sensor circuit according to one or more embodiments.

Referring to FIGS. 5 and 14, after applying an adaptive threshold setting technology, a new detection signal SA1 newly created by adding a differentiated signal SD1 to an original sensing signal S1 may exceed an adaptive threshold TH1 to enable a simultaneous touching detection may be used.

Accordingly, as a non-limiting example, a screen capture function of an example electronic device, other than separate functions performed by the electronic device for detected individual touches of the volume down key and the power on/off key, may be well operated when both the volume down key and the power on/off key are simultaneously pressed.

Figure 15:
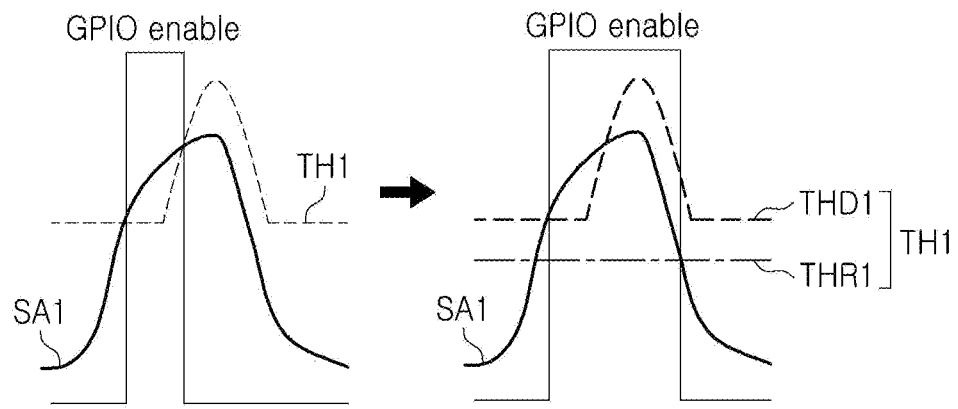
FIG. 15 is a diagram of example detection thresholds and release thresholds according to one or more embodiments.

FIG. 15 is a diagram of example detection thresholds and release thresholds, different from each other, according to one or more embodiments.

Referring to FIG. 15, as shown in a signal waveform shown on a left side of FIG. 15, in spite of adding such a differentiated signal SD1, a situation in which a first detection signal SA1 (e.g., a general purpose input/output (GPIO) signal) is enabled for shorter than a required time by an adaptive threshold may occur, which may result in the simultaneous touch detection not being detected and the corresponding simultaneous operation not performed, e.g., with a probability of about 10%.

Referring to rightward drawings of FIGS. 6 and 15, as shown in a signal waveform shown on a right side of FIG. 15, the threshold may be divided into a detection threshold and a release threshold, and a time for which a detection signal (e.g., GPIO) is enabled may be approximately doubled compared to existing time.

Accordingly, according to the one or more embodiments, the enabled time related to a detection and release operation of the sensing signal may be secured to be longer than the original required time, so that a simultaneous operation of the two sensors, such as for the example screen capture function, can be performed more stably.

Figure 16:
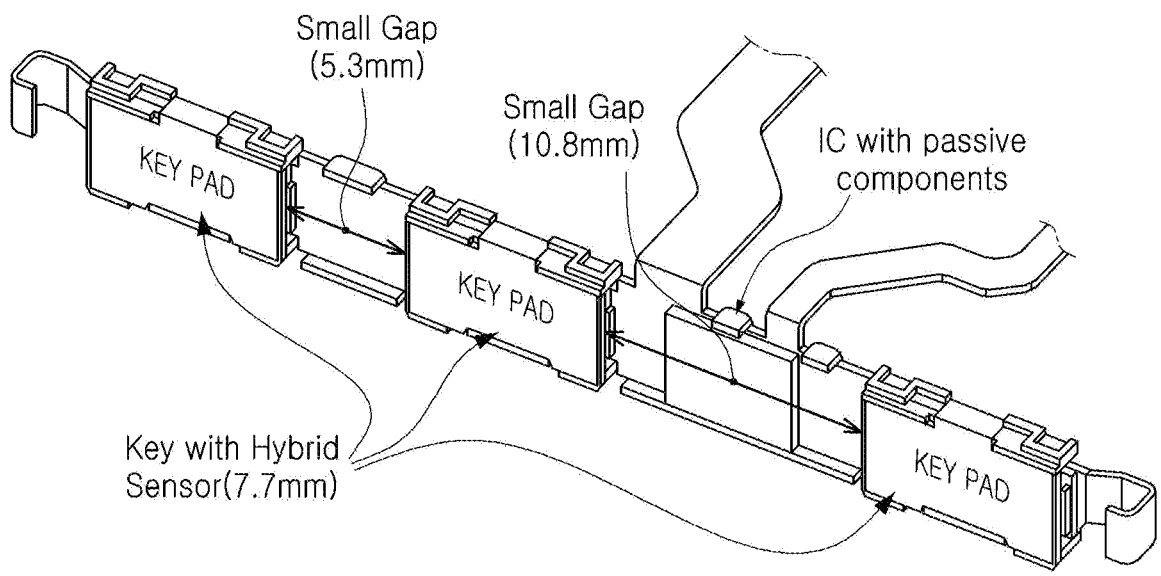
FIG. 16 is a diagram of an example touch sensing device having an example small gap between a plurality of keypads (sensors) according to one or more embodiments.

FIG. 16 is a diagram of an example touch sensing device having an example small gap between a plurality of keypads (sensors) according to one or more embodiments.

Referring to FIG. 16, for example, when a plurality of keypads (sensors) are disposed in a narrow space of an electronic device according to one or more embodiments, when a length of each of the plurality of keypads is 7.7 mm, a small gap between the keypads may be approximately 5.3 mm, noting that such lengths and gap are for explanatory purposes and examples include arrangements of keypads with various lengths and gaps therebetween.

In such a narrow dispositional space, for example, when inductive sensing for force sensing is used to attempt to ensure isolation between signals in a limited space with a narrow physical distance, by applying an adaptive threshold technology, an upgraded solution may be implement so both intended individual touches may be detected and corresponding operations performed by the electronic device, and simultaneous touches may be detected and a corresponding operation performed by the electronic device through such example differentiated solutions described herein according to one or more embodiments.

As set forth above, and as non-limiting examples, one or more embodiments provide an electronic device with a touch sensing device including at least two adjacent touch sensors, that may apply an adaptive threshold setting so, when a touch is input to one touch sensor, a potential of a touch malfunction may be lessened, reduced, or prevented by lessening, reducing, or preventing an unintended touch from being detected with respect to the other touch sensor.

In addition, in one or more embodiments, when a touch is simultaneously input or applied to two touch sensors, an example adaptive threshold setting technology may be implemented so the touch input can be more accurately detected as the simultaneous touching of the two sensors compared to typical touch sensor approaches.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device with touch sensing, comprising:
  a first sensor configured to detect a touch and to provide a first sensing signal;
  a second sensor configured to detect another touch and to provide a second sensing signal;
  a threshold generator configured to set a first threshold by a reflecting of an amount of change of the second sensing signal to an initial threshold; and
  a sensor circuit configured to generate a first differential signal based on the first sensing signal, and to determine a first touch based on a consideration of the first threshold with respect to a first signal generated based on the first differential signal and the first sensing signal,
  wherein the sensor circuit is configured to generate a second differential signal by differentiating the second sensing signal, and to determine a second touch based on a consideration of a second threshold with respect to a second signal generated based on the second differential signal and the first sensing signal.

2. The device of claim 1, wherein the threshold generator is configured to set the second threshold by a reflecting of an amount of change of the first sensing signal to the initial threshold.

3. The device of claim 2,
  wherein the threshold generator is connected to the first sensor and the second sensor.

4. The device of claim 3, wherein the threshold generator is configured to set the first threshold based on a difference value between the initial threshold and the second sensing signal, and to set the second threshold based on a difference value between the initial threshold and the first sensing signal.

5. The device of claim 3, wherein the threshold generator comprises:
  a first threshold generator configured to set the first threshold based on the amount of change of the second sensing signal being with respect to the initial threshold; and
  a second threshold generator configured to set the second threshold based on the amount of change of the first sensing signal being with respect to the initial threshold.

6. The device of claim 3, wherein the threshold generator comprises:
a first threshold generator configured to set a first detection threshold based on a difference value between the initial threshold and the second sensing signal, and configured to set a first release threshold, different from the first detection threshold, based on the initial threshold; and
a second threshold generator configured to set a second detection threshold based on a difference value between the initial threshold and the first sensing signal, and configured to set a second release threshold, different from the second detection threshold, based on the initial threshold.

7. The device of claim 6, wherein the first threshold generator is configured to set the first detection threshold by adding the amount of change, based on the initial threshold, of the second sensing signal to the initial threshold, and is configured to set the first release threshold to be the initial threshold.

8. The device of claim 6, wherein the second threshold generator is configured to set the second detection threshold by adding the amount of change, based on the initial threshold, of the first sensing signal to the initial threshold, and is configured to set the second release threshold to be the initial threshold.

9. The device of claim 3, wherein the sensor circuit is configured to:
generate the first differential signal of the first sensing signal;
generate the first signal, as a first detection signal, based on the first sensing signal;
determine the first touch to a first touch member by comparing the first detection signal with the first threshold;
generate the second differential signal of the second sensing signal;
generate the second signal, as a second detection signal, based on the second sensing signal; and
determine the second touch to a second touch member by comparing the second detection signal with the second threshold.

10. The device of claim 3, wherein the sensor circuit comprises:
a first sensor circuit configured to:
generate the first differential signal by differentiating the first sensing signal;
generate the first signal, as a first detection signal, by adding the first differential signal and the first sensing signal; and
determine the first touch to a first touch member, for a case of an electronic device, by comparing the first detection signal with the first threshold; and
a second sensor circuit configured to:
generate the second signal, as a second detection signal, by adding the second differential signal and the first sensing signal; and
determine the second touch to a second touch member, for the case of the electronic device, by comparing the second detection signal with the second threshold.

11. A device with touch sensing, comprising:
a case having a first touch member and a second touch member disposed at different positions of the case; and
a touch sensing device configured to respectively sense first and second touches to the first and second touch members,
wherein the touch sensing device comprises:
a first sensor configured to detect a touch and to provide a first sensing signal;
a second sensor configured to detect another touch and to provide a second sensing signal;
a threshold generator configured to set a first threshold by a reflecting of an amount of change of the second sensing signal to an initial threshold; and
a sensor circuit configured to generate a first differential signal based on the first sensing signal, and to determine the first touch based on a consideration of the first threshold with respect to a first signal generated based on the first differential signal and the first sensing signal,
wherein the sensor circuit is configured to generate a second differential signal by differentiating the second sensing signal, and determine the second touch based on a consideration of a second threshold with respect to a second signal generated based on the second differential signal and the first sensing signal.

12. The device of claim 11, wherein the threshold generator is configured to set the second threshold by a reflecting of an amount of change of the first sensing signal to the initial threshold.

13. The device of claim 12,
wherein the threshold generator is connected to the first sensor and the second sensor.

14. The device of claim 13, wherein the threshold generator is configured to set the first threshold based on a difference value between the initial threshold and the second sensing signal, and to set the second threshold based on a difference value between the initial threshold and the first sensing signal.

15. The device of claim 13, wherein the threshold generator comprises:
a first threshold generator configured to set the first threshold based on the amount of change of the second sensing signal being with respect to the initial threshold; and
a second threshold generator configured to set the second threshold based on the amount of change of the first sensing signal being with respect to the initial threshold.

16. The device of claim 13, wherein the threshold generator comprises:
a first threshold generator configured to set a first detection threshold based on a difference value between the initial threshold and the second sensing signal, and configured to set a first release threshold, different from the first detection threshold, based on the initial threshold; and
a second threshold generator configured to set a second detection threshold based on a difference value between the initial threshold and the first sensing signal, and configured to set a second release threshold, different from the second detection threshold, based on the initial threshold.

17. The device of claim 16, wherein the first threshold generator is configured to set the first detection threshold by adding the amount of change, based on the initial threshold, of the second sensing signal to the initial threshold, and is configured to set the first release threshold to be the initial threshold.

18. The device of claim 16, wherein the second threshold generator is configured to set the second detection threshold by adding the amount of change, based on the initial threshold, of the first sensing signal to the initial threshold, and is configured to set the second release threshold to be the initial threshold.

19. The device of claim 13, wherein the sensor circuit is configured to:
   generate the first differential signal of the first sensing signal;
   generate the first signal, as a first detection signal, based on the first sensing signal;
   determine the first touch to the first touch member by comparing the first detection signal with the first threshold;
   generate the second differential signal of the second sensing signal;
   generate the second signal, as a second detection signal, based on the second sensing signal; and
   determine the second touch to the second touch member by comparing the second detection signal with the second threshold.

20. The device of claim 13, wherein the sensor circuit comprises:
   a first sensor circuit configured to:
      generate the first differential signal by differentiating the first sensing signal;
      generate the first signal, as a first detection signal, by adding the first differential signal and the first sensing signal; and
      determine the first touch to the first touch member by comparing the first detection signal with the first threshold; and
   a second sensor circuit configured to:
      generate the second signal, as a second detection signal, by adding the second differential signal and the first sensing signal; and
   determine the second touch to the second touch member by comparing the second detection signal with the second threshold.

* * * * *